(12) United States Patent
Zhou et al.

(10) Patent No.: US 8,315,645 B2
(45) Date of Patent: Nov. 20, 2012

(54) SYSTEM AND METHOD FOR SCHEDULING OF SPECTRUM SENSING IN COGNITIVE RADIO SYSTEMS

(75) Inventors: Xiangwei Zhou, Atlanta, GA (US); Young Hoon Kwon, San Diego, CA (US); Anthony C. K. Soong, Plano, TX (US)

(73) Assignee: FutureWei Technologies, Inc., Plano, TX (US)

( * ) Notice: Subject to any disclaimer, the term of this patent is extended or adjusted under 35 U.S.C. 154(b) by 1062 days.

(21) Appl. No.: 12/258,266

(22) Filed: Oct. 24, 2008

(65) Prior Publication Data
US 2010/0003922 A1    Jan. 7, 2010

Related U.S. Application Data

(60) Provisional application No. 61/077,409, filed on Jul. 1, 2008.

(51) Int. Cl.
*H04W 72/00* (2009.01)
*H04B 17/00* (2006.01)

(52) U.S. Cl. ...................... 455/454; 455/423; 455/67.11; 455/115.1

(58) Field of Classification Search .................. 455/454, 455/423, 67.11, 115.1
See application file for complete search history.

(56) References Cited

U.S. PATENT DOCUMENTS

| | | | |
|---|---|---|---|
| 2008/0090581 A1* | 4/2008 | Hu | 455/452.1 |
| 2008/0155249 A1 | 6/2008 | Backof et al. | |
| 2008/0274731 A1* | 11/2008 | Koenck et al. | 455/426.1 |
| 2009/0247201 A1* | 10/2009 | Ye et al. | 455/509 |

FOREIGN PATENT DOCUMENTS

| | | |
|---|---|---|
| CN | 1889403 A | 1/2007 |
| CN | 101127573 A | 2/2008 |
| WO | WO 2007/094604 A1 | 8/2007 |

OTHER PUBLICATIONS

Written Opinion of the International Searching Authority, International Application No. PCT/CN2009/070488, Applicant: Huawei Technologies Co., Ltd., May 28, 2009, 4 pages.
Cabric, D., et al., "Implementation Issues in Spectrum Sensing for Cognitive Radios," Proceedings of IEEE Asilomar Conference on Signals, Systems, and Computing, Nov. 2004, pp. 772-776.
Haykin, S., "Cognitive Radio: Brain-Empowered Wireless Communications," IEEE Journal on Selected Areas in Communications, vol. 23, No. 2, Feb. 2005, pp. 201-220.
Mitola, J. III, et al., "Cognitive Radio: Making Software Radios More Personal," IEEE Personal Communications, Aug. 1999, pp. 13-18.

(Continued)

*Primary Examiner* — Wen Huang
(74) *Attorney, Agent, or Firm* — Slater & Matsil, L.L.P.

(57) ABSTRACT

System and method for scheduling spectrum sensing in cognitive radio systems. A method comprises sensing an availability of a spectrum band, computing a duration of an inter-sensing time block based on the availability of the spectrum band, and scheduling an occurrence of the spectrum sensing operation using the duration of the inter-sensing time block. Computing the duration of the inter-sensing time block based on the availability of the spectrum band allows for an optimization of communications of the cognitive radio system, thereby increasing spectral efficiency and reducing interference to licensed communications.

20 Claims, 8 Drawing Sheets

OTHER PUBLICATIONS

Tang, H., "Some Physical Layer Issues of Wide-Band Cognitive Radio Systems," Proceedings of IEEE International Symposium on New Frontiers in Dynamic Spectrum Access Networks, Nov. 2005, pp. 151-159.

Tian, Z., et al., "A Wavelet Approach to Wideband Spectrum Sensing for Cognitive Radios," Proceedings of International Conference on Cognitive Radio Oriented Wireless Networks and Communications, Jun. 2006, 5 pages.

Zeng, Y., et al., "Maximum-Minimum Eigenvalue Detection for Cognitive Radio," the $18^{th}$ Annual IEEE International Symposium on Personal, Indoor and Mobile Radio Communications, Sep. 2007, 5 pages.

Vujicic, Bozidar, et al., "Modeling and Characterization of Traffic in Public Safety Wireless Networks," Proceedings from the International Symposium on Performance Evaluation of Computing and Telecommunications Systems, Jul. 2005, pp. 214-233, Philadelphia, Pennsylvania.

Wang, Peng, et al., "Optimization of Detection Time for Channel Efficiency in Cognitive Radio Systems," Proc. IEEE Wireless Commun. and Networking Conf., Mar. 2007, pp. 111-115, IEEE Communications Society, Hong Kong.

Liang, Ying-Chang, et al., "Sensing-Throughput Tradeoff for Cognitive Radio Networks: How Frequently Should Spectrum Sensing Be Carried Out?", Proc. IEEE Int. Symp. Personal, Indoor and Mobile Radio, Commun., Sep. 2007, pp. 1-5, Athens, Greece.

Hoang, Anh Tuan, et al., "Adaptive Scheduling of Spectrum Sensing Periods in Cognitive Radio Networks," Proc. IEEE Global Telecommun, Conf., Nov. 2007, pp. 3128-3132, Washington, DC.

Kim, Hyoil, et al., "Efficient Discovery of Spectrum Opportunities with MAC-Layer Sensing in Cognitive Radio Networks," IEEE Transactions on Mobile Computing, May 2008, pp. 533-545, vol. 7.

Lee, Won-Yeol, et al., "Optimal Spectrum Sensing Framework for Cognitive Radio Networks," IEEE Transactions on Wireless Communications, Oct. 2008, pp. 3845-3857, vol. 7, No. 10.

Zhao, Q., et al., "A Survey of Dynamic Spectrum Access: Signal processing, networking, and regulatory policy," IEEE Signal Processing Magazine, May 2007, vol. 79, pp. 29-89.

Akyildiz, I.F., et al., " NeXt generation/dynamic spectrum access/cognitive radio wireless networks: A survey," Computer Networks 50, Sep. 2006, pp. 2127-2159.

Ghasemi, A., et al., "Collaborative Spectrum Sensing for Opportunistic Acces in Fading Environments," New Frontiers in Dynamic Spectrum Access Networks, Nov. 2005, pp. 131-136.

Ganesan, G., et al., "Spatiotemporal Sensing in Cognitice Radio Networks," IEEE Journal on Selected Area in Communications, vol. 26, No. 1, Jan. 2008, pp. 5-12.

Zhao, Q., et al., "Optimal Dynamic Spectrum Access via Periodic Channel Sensing," IEEE Wireless Communication and Networking Conference, Mar. 2007, pp. 33-37.

Ghasemi, A., et al., "Optimization of Spectrum Sensing for Opportunistic Spectrum Access in Cognitive Radio Networks, " IEEE Consumer Communication and Networking Conference, Jan. 2007, pp. 1022-1026.

Luo, L., et al., " Analysis of Search Schemes in Cognitive Radio," IEEE Workshop Networking Technologies for.Software Define Radio Networks, Jun. 2007, pp. 17-24.

Yang, L., et al., "Proactive Channel Access in Dynamic Spectrum Networks, "Cognitive Radio Oriented Wireless Networks and dommunication, Aug. 2007, 5 pp.

* cited by examiner

SYSTEM AND METHOD FOR SCHEDULING OF SPECTRUM SENSING IN COGNITIVE RADIO SYSTEMS

This application is related to the following co-assigned patent application: Ser. No. 61/077,409, filed Jul. 1, 2008, entitled "Scheduling of Spectrum Sensing for Cognitive Radio," which application is hereby incorporated herein by reference.

TECHNICAL FIELD

The present invention relates generally to a system and method for wireless communications, and more particularly to a system and method for scheduling spectrum sensing in cognitive radio systems.

BACKGROUND

Through the use of dynamic and opportunistic spectrum access, cognitive radio (CR) enables high spectrum efficiency. The term cognitive radio was first proposed in late 1990s (see, J. Mitola and G. Q. Maquire, "Cognitive radio: making software radios more personal," IEEE Personal Communications, August 1999) and a comprehensive overview has been provided in S. Haykin, "Cognitive radio: Brain-empowered wireless communications," IEEE Journal on Selected Areas in Communications, vol. 23, No. 2, pp. 201-220, February 2005.

The basic concept of CR is to allow unlicensed CR users, also called secondary users, to use licensed spectrum bands (also referred to as licensed frequency bands) as long as they do not cause interference to licensed users, also called primary users. Therefore, CR users must be able to identify and use spectrum bands that are not being used by primary users. Several spectrum sensing techniques, such as matched filter detection, energy detection, feature detection, wavelet-based detection, and covariance-based detection, have been introduced to allow CR to identify a licensed signal within a spectrum band (see, D. Cabric, S. M. Mishra, and R. W. Brodersen, "Implementation issues in spectrum sensing for cognitive radios," Proceedings of IEEE Asilomar Conference on Signals, Systems, and Computing, Pacific Grove, Calif., November 2004, pp. 772-776; H. Tang, "Some physical layer issues of wide-band cognitive radio systems," Proceedings of IEEE International Symposium on New Frontiers in Dynamic Spectrum Access Networks, Baltimore, Md., November 2005, pp. 151-159; Z. Tian and G. B. Giannakis, "A wavelet approach to wideband spectrum sensing for cognitive radios," Proceedings of International Conference on Cognitive Radio Oriented Wireless Networks and Communications, Mykonos, Greece, June 2006, pp. 1-5; Y. Zeng and Y. C. Liang, "Maximum-minimum eigenvalue detection for cognitive radio," Proceedings of IEEE International Symposium on Personal Indoor and Mobile Radio Communications, Athens, Greece, September 2007, pp. 1-5). Furthermore, cooperative spectrum sensing schemes have also been proposed to improve spectrum detection performance under fading and shadowing environments.

However, the efficiency of opportunistic spectrum sharing of a CR system relies not only on the performance of spectrum sensing techniques, but also on the scheduling of spectrum sensing activities (see, A. T. Hoang and Y.-C. Liang, "Adaptive scheduling of spectrum sensing periods in cognitive radio networks," Proceedings of IEEE Global Telecommunications Conference, Washington, D.C., November 2007, pp. 3128-3132). If spectrum sensing activities are scheduled too often, the CR user may spend too much time on spectrum sensing, which is neither energy efficient nor bandwidth efficient. If spectrum sensing activities are seldom scheduled, a transmission made by a licensed user may not be quickly discovered, which may be harmful to licensed communications since a CR user may think that it may be free to transmit and cause interference with the transmission made by the licensed user.

In a periodic spectrum sensing framework, wherein a frame consists of a spectrum sensing block and an inter-sensing block, a ratio of spectrum sensing block length to inter-sensing block length represents how frequently spectrum sensing activities are scheduled, and determines the spectrum efficiency of the CR system, as well as the interference duration of the licensed system. Therefore, the ratio is a key parameter in spectrum sensing scheduling. Recently, optimizations of both the spectrum sensing and the inter-sensing block lengths have been studied using statistics of licensed spectrum band occupancy and spectrum sensing block length optimization has been investigated to improve bandwidth efficiency of a CR system over single and multiple licensed spectrum bands. However, a reappearance of licensed users (i.e., a transmission subsequent to a spectrum sensing activity) and possible detection errors have not been taken into consideration.

SUMMARY OF THE INVENTION

These and other problems are generally solved or circumvented, and technical advantages are generally achieved, by embodiments of a system and a method for scheduling spectrum sensing in cognitive radio systems.

In accordance with an embodiment, a method scheduling a spectrum sensing operation is provided. The method includes sensing an availability of a spectrum band, computing a duration of an inter-sensing time block based on the availability of the spectrum band, and scheduling an occurrence of the spectrum sensing operation using the duration of the inter-sensing time block.

In accordance with another embodiment, a method for operating an electronic device is provided. The method includes sensing a state of a spectrum band during a first sensing time block, computing a duration of an inter-sensing time block based on the state of the spectrum band, scheduling an occurrence of a second sensing time block using the computed duration of the inter-sensing time block, and operating the electronic device for the computed duration of the inter-sensing time block. The method also includes repeating the sensing, the computing, the scheduling, and the operating for the second sensing time block in response to determining that a current time is about equal to a scheduled time for the occurrence of the second sensing time block. The inter-sensing time block follows the first sensing time block.

In accordance with another embodiment, an electronic device is provided. The electronic device includes a receiver coupled to an antenna, a transmitter coupled to the antenna, and a processor coupled to the receiver and to the transmitter. The receiver receives signals detected by the antenna, the transmitter transmits signals using the antenna, and the processor senses a state of a spectrum band over which signals are transmitted and received, and calculates a duration of an inter-sensing block that will allow the electronic device to participate in communications with another electronic device or to remain idle based on the state of the spectrum band.

An advantage of an embodiment is that a duration of an inter-sensing block may be computed based on a result of a preceding spectrum sensing block. This may allow for individual optimization of the inter-sensing block duration depending on a state of the spectrum band.

A further advantage of an embodiment is that statistical information of licensed spectrum band usage is taken into consideration in the computing of the duration of the inter-sensing block. This may lead to better performance of a CR system while reducing impact on a licensed system. Furthermore, statistical information may be readily obtainable and easy to process.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a CR system operating in close proximity to a licensed system, wherein the CR system operates in an alternating fashion with spectrum sensing periods separated by an inter-sensing period. Additionally, the invention may be applied to CR systems using directional antennas and/or antenna arrays with beam forming.

Figure 1:
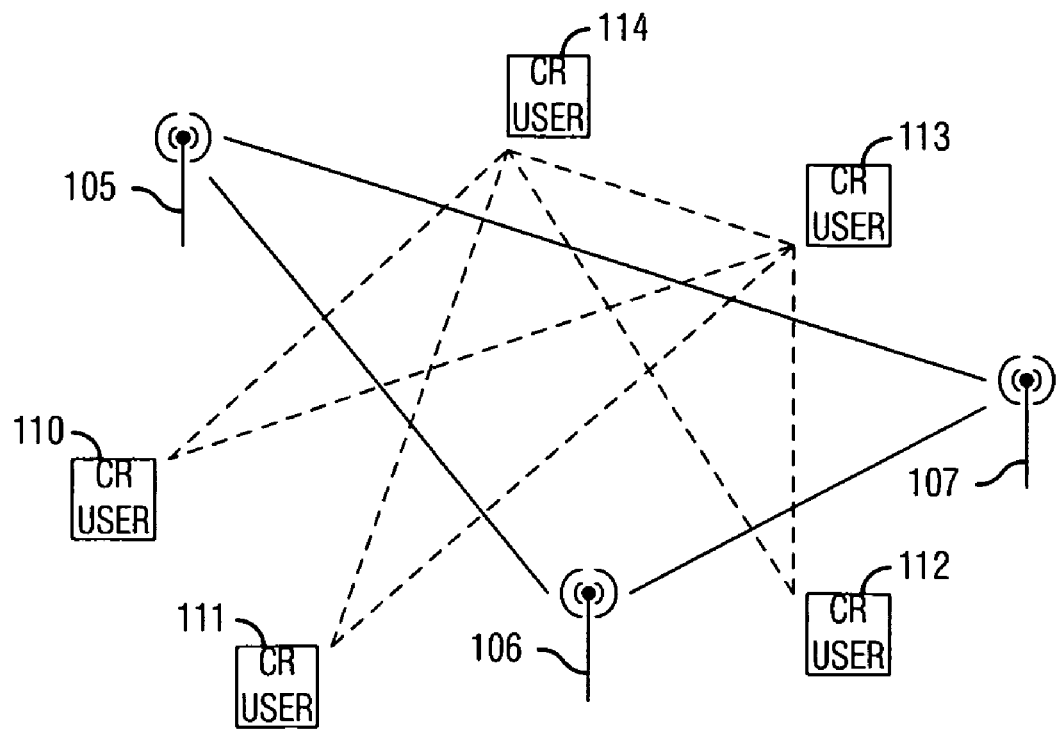
FIG. 1 is a diagram illustrating a licensed system and a CR system operating in close proximity, sharing a spectrum band.

With reference now to FIG. 1, there is shown a diagram illustrating a licensed system and a CR system operating in close proximity, sharing a spectrum band. The licensed system includes licensed users 105-107 and the CR system includes CR users 110-114. Transmissions between licensed users are shown as solid lines, while transmissions between CR users are shown as dashed lines. A pair of CR users, such as CR user 110 and CR user 114, opportunistically operates on the spectrum band that is assigned to the licensed system. The CR users use spectrum sensing to determine the presence or absence of licensed activity within the spectrum band and if there is no licensed activity, the CR users may transmit in the spectrum band.

In order to effectively use the spectrum band, the CR users periodically perform a spectrum sensing activity and then, based on results of a spectrum sensing activity, the CR users may transmit (if the spectrum band is idle) or remain silent (if the spectrum band is busy). This type of operation may be referred to as periodic spectrum sensing.

Figure 2:
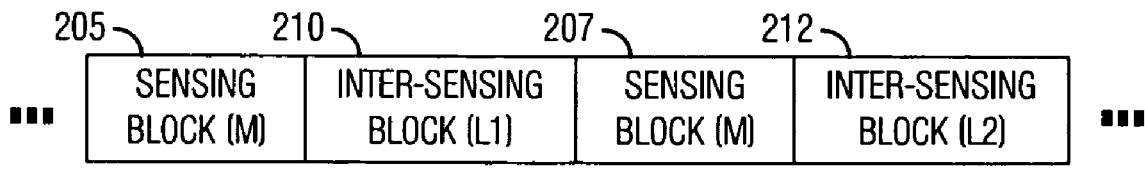
FIG. 2 is a diagram illustrating periodic spectrum sensing.

FIG. 2 is a diagram illustrating periodic spectrum sensing. Periodic spectrum sensing comprises multiple time blocks (periods) of spectrum sensing, such as sensing block 205 and 207, separated by inter-sensing time blocks, such as inter-sensing block 210 and 212. If a CR user senses that the spectrum band is idle during a sensing block, such as sensing block 205, then the CR user may transmit during a following inter-sensing block, such as inter-sensing block 210. However, if the CR user senses that the spectrum band is busy during sensing block 205, then the CR user must remain idle during inter-sensing block 210.

Generally, the duration of the sensing blocks and the inter-sensing blocks may be fixed, with the duration of the sensing blocks being M sample periods long and the duration of the inter-sensing blocks being L sample periods long. However, the duration of the inter-sensing blocks may have an impact on the performance of both the licensed system and the CR system. If the spectrum band is detected as being busy during a sensing block, the duration of the following inter-sensing block may affect how much time elapses before the CR system may be able to transmit. If the inter-sensing block is too long, then the CR system may needlessly wait for the opportunity to transmit while the spectrum band is idle after the detected licensed activity completes. While if the inter-sensing block is too short, then the CR system will waste too much time and power performing spectrum sensing.

If the spectrum band is detected as being idle during a sensing block, the duration of the following inter-sensing block may affect the ability of the licensed system to complete an interference free transmission. If the inter-sensing block is too long, then the licensed system may try to transmit while the CR system is transmitting, resulting in interference for the licensed system. While if the inter-sensing block is too short, then the CR system will waste time and power performing spectrum sensing when it could be transmitting.

Since a spectrum sensing generally requires a specified amount of time to complete, the sensing blocks should be a fixed duration. However, the inter-sensing blocks may have varying duration to help optimize the performance of both the licensed system and the CR system. For example, inter-sensing block 210 may have a duration equal to L1 samples and inter-sensing block 212 may have a duration equal to L2 samples, with L1 and L2 potentially being equal, but not necessarily so.

Figure 3A:
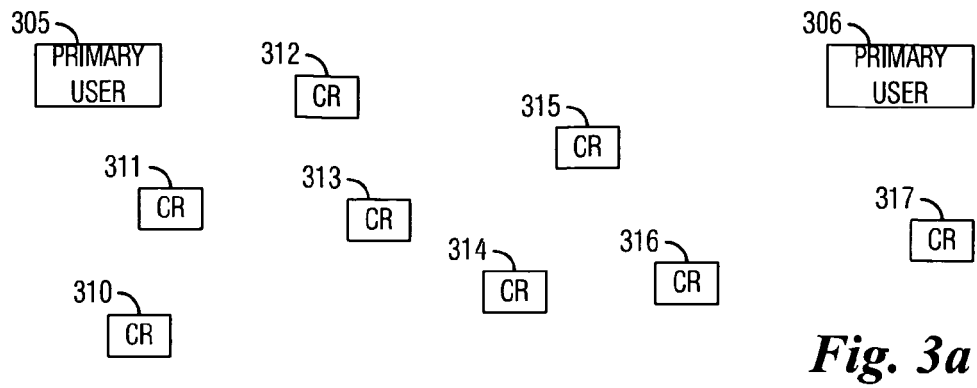
FIG. 3a is a diagram illustrating a licensed system and a CR system operating in close proximity.

FIG. 3a is a diagram illustrating a licensed system and a CR system operating in close proximity. The licensed system includes a first primary user 305 and a second primary user 306, while the CR system includes a plurality of CR users, such as CR users 310-317. Each CR user may transmit to other CR users depending on spectrum band availability.

Figure 3B:
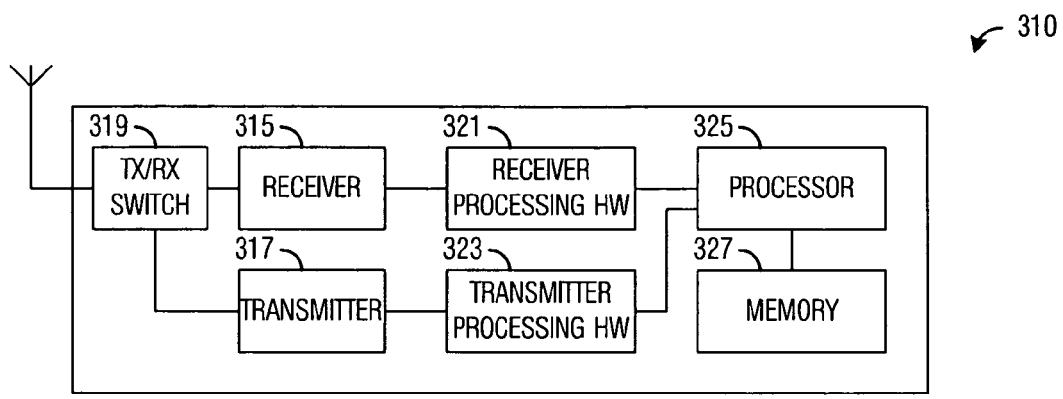
FIG. 3b is a diagram illustrating a CR user.

FIG. 3b is a diagram illustrating a CR user, such as CR user 310. CR user 310 includes a receiver 315 and a transmitter 317 for use in receiving signals and transmitting signals. Depending on configuration, a transmit/receive (TX/RX) switch 319 may allow for the receiver 315 and the transmitter 317 to share an antenna. Alternatively, the receiver 315 and the transmitter 317 may have dedicated receive and transmit antennas.

CR user 310 also includes receiver processing hardware 321 that may be used for processing received signals, including filtering, decoding, error detecting and correcting, amplifying, digitizing, mixing, and so forth. CR user 310 also includes transmitter processing hardware 323 that may be used for processing signals to be transmitted, including filtering, encoding, mixing, amplifying, and so on. Output of receiver processing hardware 321, such as data, may be provided to a processor 325. Processor 325 may be used to perform computations using the output of receiver processing hardware 321. A memory 327 may be used to store data, applications, programs, configuration information, and so forth.

Figure 3C:
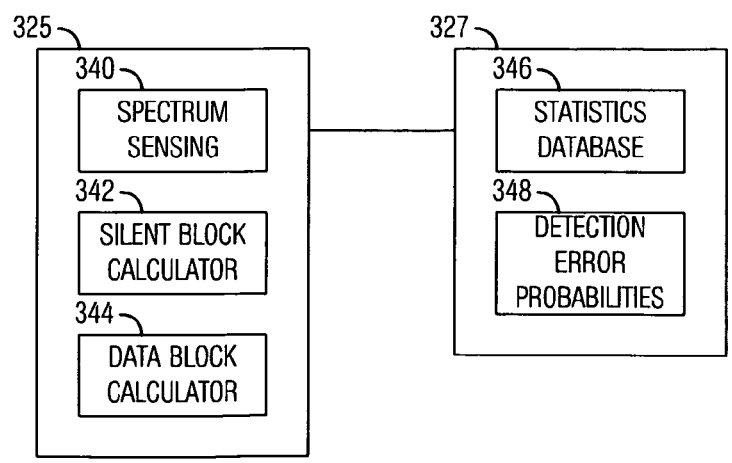
FIG. 3c is a diagram illustrating a detailed view of processor and memory.

FIG. 3c is a diagram illustrating a detailed view of processor 325 and memory 327. Processor 325 includes a spectrum sensing unit 340. Spectrum sensing unit 340 may be used to sense a received energy within a specified spectrum band. Then, from the received energy, it may be determined if a transmission is taking place. Spectrum sensing unit 340 may sense the received energy by filtering a received signal to help eliminate or reduce signals outside of the specified spectrum band, measure a received energy within the specified spectrum band, accumulate the received energy for a specified amount of time, and then based on the accumulated received energy, decide if a transmission is taking place in the specified spectrum band.

Processor 325 also includes a silent block calculator unit 342. The silent block calculator unit 342 may be used to calculate a duration of an inter-sensing block if during an immediately preceding sensing block, the spectrum band was determined to be busy. The silent block calculator unit 342 may use a variety of information and data stored in memory 327, including contents of a statistics database 346 that may be used to maintain historical information related to licensed usage of the spectrum band, and a detection error probabilities store 348 that may be used to maintain computed information such as calculated error detection probabilities, false detection probabilities, and so forth.

Processor 325 also includes a data block calculator unit 344. The data block calculator unit 344 may be used to calculate a duration of an inter-sensing block if during an immediately preceding sensing block, the spectrum band was determined to be idle. The data block calculator unit 342 may use a variety of information and data stored in memory 327, such as the contents of statistics database 346 and detection error probabilities store 348.

Figure 4:
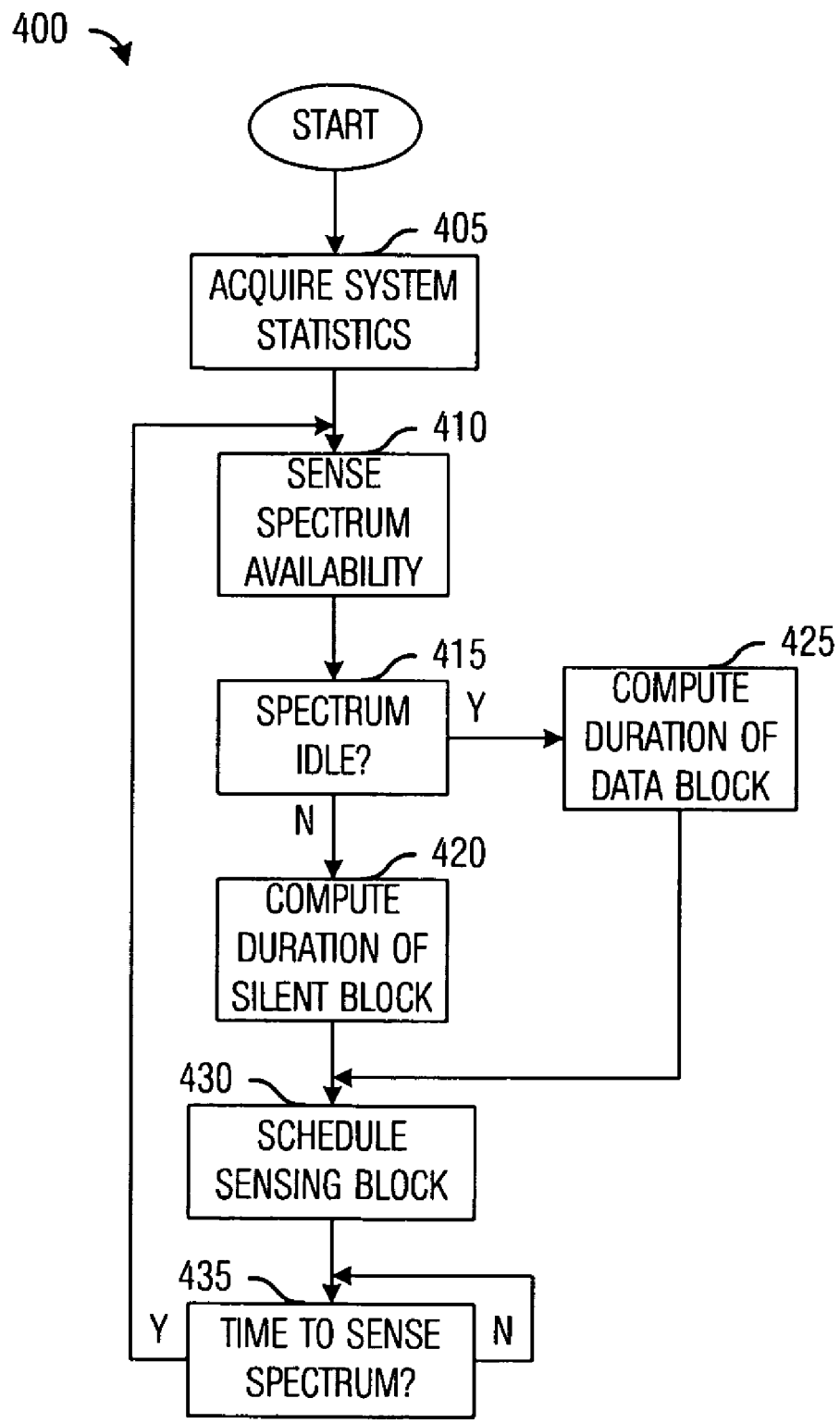
FIG. 4 is a flow diagram illustrating a sequence of events in the scheduling of sensing blocks.

FIG. 4 is a flow diagram illustrating a sequence of events 400 in the scheduling of sensing blocks. Sequence of events 400 may be descriptive of events occurring in the scheduling of sensing blocks in a CR user of a CR system. The scheduling of sensing blocks may occur while the CR user is in an operating mode that permits spectrum sensing and transmissions, such as a normal transmission mode, low power mode, and so forth, and may continue until the operating mode is stopped or the CR user is turned off, reset, or so on.

The scheduling of sensing blocks may begin with the CR user acquiring system statistics (block 405). The CR user may acquire statistics related to the usage of a spectrum band by licensed users in a licensed system, usage of the spectrum band by CR users in the CR system, and so forth. The CR user may acquire statistics by monitoring the spectrum band for a period of time. The CR user may acquire the statistics by entering an acquisition mode when it is initially turned on. The CR user may further acquire statistics by periodically entering the acquisition mode to help ensure that the system statistics remain accurate. Alternatively, the CR user may access stored system statistics which were previously collected and stored. The stored system statistics may be stored in the CR user, in a centralized location (database) accessible by CR users in the CR system, etc. Furthermore, the CR user may use a combination of both stored system statistics and monitored statistics.

After the CR user has acquired system statistics, the CR user may sense availability of the spectrum band (block 410). The CR user may make use of a spectrum sensing unit, such as spectrum sensing unit 340, to sense spectrum availability. If the spectrum band is busy (not available for use by the CR user), the CR user may compute a duration of an inter-sensing block that will not be used for transmission by the CR user, i.e., a silent block (block 420).

In order to compute the duration of the silent block, a model of the spectrum band is needed. The spectrum band is modeled as an alternating renewable source that alternates between busy and idle states. The busy and idle states denote that the spectrum band is occupied and unoccupied by licensed users, respectively. The busy and idle states have finite duration (busy periods and idle periods), which are assumed to be exponentially distributed. The busy and idle periods have probability density functions expressible as:

$$f_B(t) = \alpha e^{-\alpha t} \quad (1)$$

and $$f_I(t) = \beta e^{-\beta t}, \quad (2)$$

where $\alpha$ is the transition rate from busy to idle state, and $\beta$ is the transition rate from idle to busy state, respectively. Both $\alpha$ and $\beta$ may be estimated using statistical methods. In the discussion below, it is assumed that the probability density functions of the busy and idle periods are known to the CR user (e.g., they were acquired in block 405).

Accordingly, average busy and idle periods are $1/\alpha$ and $1/\beta$, and the stationary probabilities for the spectrum band to be busy and idle are expressible as:

$$\overline{P}_B = \frac{\beta}{\alpha + \beta} \quad (3)$$

and $$\overline{P}_I = \frac{\alpha}{\alpha + \beta}, \quad (4)$$

respectively.

Due to the memoryless property of the exponential distribution, the probability density functions of the remaining time that the spectrum band remains in a current busy and idle states are expressible as:

$$f_{BR}(t) = \alpha e^{-\alpha t} \quad (5)$$

and $$f_{IR}(t) = \beta e^{\beta t}, \quad (6)$$

which are identical to equations (1) and (2).

Conventionally, the frame structure is fixed, i.e., the inter-sensing block length L is fixed as well as M. However, depending on different sensing decisions and resulting CR activities, L should not always be the same. Furthermore, with varying licensed activities and detection errors, L should be changed accordingly. For the benefit of the CR user and to protect the licensed communication, after the current sensing block of M samples, the CR user needs to determine the appropriate inter-sensing block length L in order to schedule the start of the next sensing block. There are two different cases for the scheduling as described below.

If the spectrum band is busy at the end of a sensing block, then the conditional probability that the spectrum band remains busy at the l-th sample of the immediately following inter-sensing block is expressible as:

$$P_{B|B} = Pb\{t > l\tau \mid B\} = \int_{l\tau}^{\infty} f_{BR}(t)dt = e^{-\alpha l\tau}, \quad (7)$$

where t is the remaining time in the current state from the last sample of the sensing block, and $\tau$ is the sampling interval. The conditional probability that the spectrum band is idle at the l-th sample of the immediately following inter-sensing block is expressible as:

$$P_{I|B} = 1 - P_{B|B} = 1 - e^{-\alpha l\tau}. \quad (8)$$

Similarly, if the spectrum band is idle at the end of a sensing block, then the conditional idle and busy probabilities at the l-th sample of the immediately following inter-sensing block are expressible as:

$$P_{I|I} = Pb\{t > l\tau \mid I\} = \int_{l\tau}^{\infty} f_{IR}(t)dt = e^{-\beta l\tau} \quad (9)$$

and $$P_{B|I} = 1 - P_{I|I} = 1 - e^{-\beta l\tau}, \quad (10)$$

respectively.

In order to compute the duration of the silent block, an average spectrum opportunity loss is defined as an expected number of idle samples within the inter-sensing block immediately following the sensing block wherein the spectrum band is detected as being busy. The average spectrum opportunity loss may be expressible as:

$$T_{I_L|\hat{B}} = \sum_{l=1}^{L} P_{I|\hat{B}}, \quad (11)$$

where $P_{I|\hat{B}}$ is the conditional probability at the l-th sample of the immediately following inter-sensing block if the spectrum band is detected as busy in the sensing block. The average spectrum opportunity loss characterizes the unrecognized transmission opportunity for the CR user.

There may be two different situations wherein the CR user may keep silent in an inter-sensing block: i) the result of the sensing operation in the sensing block was busy when the spectrum band is truly busy at the end of the sensing block (correct detection) and ii) the result of the sensing operation in the sensing block is busy when the spectrum band is truly idle at the end of the sensing block (false alarm). Since the conditional idle probability at the l-th sample of the inter-sensing block immediately following the sensing block wherein the spectrum band is detected is busy is expressible as:

$$P_{I|\hat{B}} = P_{I|B} P_{B|\hat{B}} + P_{I|I} P_{I|\hat{B}}, \quad (12)$$

where $P_{I|B}$ and $P_{I|I}$ are conditional idle probabilities with perfect spectrum band sensing as introduced previously, $P_{B|\hat{B}}$ and $P_{I|\hat{B}}$ are conditional busy and idle probabilities at the end of the sensing block if the spectrum band is detected as being busy in the sensing block, respectively. Then, applying Bayes' theorem:

$$P_{B|\hat{B}} = \frac{P_{\hat{B}|B} P_B}{P_{\hat{B}|B} P_B + P_{\hat{B}|I} P_I} \quad (13)$$

and $$P_{I|\hat{B}} = \frac{P_{\hat{B}|I} P_I}{P_{\hat{B}|B} P_B + P_{\hat{B}|I} P_I}, \quad (14)$$

where $P_{\hat{B}|B}$ or $P_{\hat{B}|I}$ is the conditional probability that the spectrum band is detected as being busy if the spectrum band is busy or idle at the end of the sensing block, which may be set equal to the average detection probability, $P_D$, or false alarm probability, $P_F$; $P_B$ or $P_I$ is the busy or idle probability at the end of the sensing block, which may be substituted with the stationary probability $\overline{P}_B$ in equation (3) or $\overline{P}_I$ in equation (4), respectively. This leads to:

$$P_{B|\hat{B}} = \frac{P_D \overline{P}_B}{P_D \overline{P}_B + P_F \overline{P}_I} \quad (15)$$

and $$P_{I|\hat{B}} = \frac{P_F \overline{P}_I}{P_D \overline{P}_B + P_F \overline{P}_I}. \quad (16)$$

Substitute equations (8), (9), and (12) into equation (11), then the relationship between the length of the silent block, L, and the average spectrum opportunity loss, $T_{I_L|\hat{B}}$, may be expressed as:

$$T_{I_L|\hat{B}} = \left( L - \frac{1 - e^{-\alpha \tau L}}{1 - e^{-\alpha \tau}} e^{-\alpha \tau} \right) P_{B|\hat{B}} + \frac{1 - e^{-\beta \tau L}}{1 - e^{-\beta \tau}} e^{-\beta \tau} P_{I|\hat{B}}. \quad (17)$$

Generally, to identify a spectrum opportunity quickly, it is usually required that L be small such that $\alpha \tau L$ and $\beta \tau L$ are close to zero (0). Therefore, it may be possible to approximate the spectrum opportunity loss with partial Taylor polynomials. This may be expressed as:

$$T_{I_L|\hat{B}} = \frac{\alpha\tau L^2}{2} P_{B|\hat{B}} + \left(L - \frac{\beta\tau L^2}{2}\right) P_{I|\hat{B}}. \quad (18)$$

Equation (18) is an increasing function of the silent block length L. So, if it is required that the spectrum opportunity loss $T_{I_L|\hat{B}}$ to be no larger than a predefined value, $T_\lambda$, which represents the identification speed requirement, the optimal length of the silent block, which also results in the least energy consumption, is expressible as:

$$L_{opt} = \left\lceil \frac{\sqrt{P_{I|\hat{B}}^2 + 2(P_{B|\hat{B}}\alpha\tau - P_{I|\hat{B}}\beta\tau)T_\lambda} - P_{I|\hat{B}}}{P_{B|\hat{B}}\alpha\tau - P_{I|\hat{B}}\beta\tau} \right\rceil. \quad (19)$$

If the spectrum band is idle (available for use by the CR user), the CR user may compute a duration of an inter-sensing block that will be used for transmission by the CR user, i.e., a data block (block 425).

In order to compute the duration of the data block, two metrics are introduced: an average transmission rate and average interference power. The average transmission rate η may be defined as the expected rate of the CR communication within the entire frame and may be expressed as:

$$\eta = \frac{\sum_{l=1}^{L} P_{I_l|\hat{I}} R_l}{M + L}, \quad (20)$$

where $P_{I_l|\hat{I}}$ is the conditional idle probability that the l-th sample of the inter-sensing block immediately following the sensing block if the spectrum band is detected as idle, and $R_l$ is the transmission rate of the CR user at the l-th sample of the inter-sensing block immediately following the sensing block. It may be shown that $R_l$ is related to the transmit power $S_l$ at the l-th sample by expression:

$$R_l = \log_2\left(1 + \frac{S_l G}{N_o}\right), \quad (21)$$

where G is the power gain from a CR transmitter to CR receiver and $N_o$ is the noise variance at the CR receiver. G and $N_o$ are both assumed to be constant during each data block. A larger average transmission rate indicates higher bandwidth efficiency.

Similarly, average interference power ε may be defined as the expected interference power at a licensed receiver from CR communications within the entire frame and may be expressed as:

$$\varepsilon = \frac{\sum_{l=1}^{L} P_{B_l|\hat{I}} S_l G'}{M + L}, \quad (22)$$

where $P_{B_l|\hat{I}}$ is the conditional busy probability at the l-th sample of the inter-sensing block immediately following the sensing block if the spectrum band is detected as idle, which is equal to $1 - P_{I_l|\hat{I}}$, and G' is the power gain from the CR transmitter to the licensed receiver. G' is also assumed to be constant during each data block. In order to provide sufficient protection of licensed communications, it may be required that the average interference power is constrained to an acceptable level.

If the length of the sensing block is predetermined in order to achieve a certain detection performance, the data block length optimization may be formulated as selecting the length of the data block so that 1) the average interference power (equation (22)) is no more than a predefined threshold and 2) the average transmission rate (equation (20) is maximized.

To calculate the average transmission rate and the average interference power, the conditional idle or busy probability at the l-th sample of the inter-sensing block immediately following the sensing block if the spectrum band is detected as idle, $P_{I_l|\hat{I}}$ or $P_{B_l|\hat{I}}$. There may be two cases when the CR user may initiate a data transmission in the inter-sensing block: i) the sensing decision is idle while the spectrum band is actually busy at the end of the sensing block (miss detection), and ii) the sensing decision is idle while the spectrum band is truly idle at the end of the sensing block (no false alarm). It may be shown that $$P_{I_l|\hat{I}} = P_{I_l|B} P_{B|\hat{I}} + P_{I_l|I} P_{I|\hat{I}}, \quad (23)$$

where $P_{B|\hat{I}}$ and $P_{I|\hat{I}}$ are the conditional busy and idle probabilities at the end of the sensing block if the spectrum band is detected as idle in the sensing block, which may be represented as:

$$P_{B|\hat{I}} = \frac{(1 - P_D)\bar{P}_B}{(1 - P_D)\bar{P}_B + (1 - P_F)\bar{P}_I} \quad (24)$$

and $$P_{I|\hat{I}} = \frac{(1 - P_F)\bar{P}_I}{(1 - P_D)\bar{P}_B + (1 - P_F)\bar{P}_I}, \quad (25)$$

respectively. If the transmit power of the CR user at each sample of the data block is equal to S, the rate of the CR user at each sample will be equal to $R = \log_2(1 + SG/N_0)$. Substituting equations (8), (9), and (23) into equation (20), the relationship between the length of the data block and the average transmission rate may be expressed as:

$$\eta = R\frac{\left(L - \frac{1 - e^{-\alpha\tau L}}{1 - e^{-\alpha\tau}}e^{-\alpha\tau}\right)P_{B|\hat{I}} + \frac{1 - e^{-\beta\tau L}}{1 - e^{-\beta\tau}}e^{-\beta\tau}P_{I|\hat{I}}}{M + L}. \quad (26)$$

Since $P_{B_l|\hat{I}} = 1 - P_{I_l|\hat{I}}$, the relationship between the length of the data block and the average interference power is expressible as:

$$\varepsilon = SG'\frac{\frac{1 - e^{-\alpha\tau L}}{1 - e^{-\alpha\tau}}e^{-\alpha\tau}P_{B|\hat{I}} + \left(L - \frac{1 - e^{-\beta\tau L}}{1 - e^{-\beta\tau}}e^{-\beta\tau}\right)P_{I|\hat{I}}}{M + L}. \quad (27)$$

In order to avoid unbearable interference with the licensed user, it may be required that L is small such that ατL and βτL are close to zero (0). Therefore, it may be possible to approximate using partial Taylor polynomials. The approximations may be expressed as:

$$\eta = R \frac{\frac{\alpha \tau L^2}{2} P_{B|\hat{I}} + \left(L - \frac{\beta \tau L^2}{2}\right) P_{I|\hat{I}}}{M + L} \quad (28)$$

and $$\varepsilon = SG' \frac{\left(L - \frac{\alpha \tau L^2}{2}\right) P_{B|\hat{I}} + \frac{\beta \tau L^2}{2} P_{I|\hat{I}}}{M + L}. \quad (29)$$

Equation (28) is an initially increasing and then decreasing as the length of the data block increases, and equation (29) is an increasing function of the data block length. The maximum value of equation (28) may be achieved at:

$$L = L_{opt}^{(1)} = \left\lfloor \sqrt{M^2 + \frac{2 P_{I|\hat{I}} M}{P_{I|\hat{I}} \beta \tau - P_{B|\hat{I}} \alpha \tau}} - M \right\rfloor. \quad (30)$$

To ensure that $\varepsilon \leq SG'\Gamma$, the following is required:

$$L \leq L_{opt}^{(2)} = \left\lfloor \frac{\sqrt{(P_{B|\hat{I}} - \Gamma)^2 + 2(P_{I|\hat{I}} \beta \tau - P_{B|\hat{I}} \alpha \tau)\Gamma L} - P_{B|\hat{I}} + \Gamma}{P_{I|\hat{I}} \beta \tau - P_{B|\hat{I}} \alpha \tau} \right\rfloor, \quad (31)$$

where $\Gamma$ is an interference threshold for protecting licensed users. Therefore, the optimal length of the data block is expressible as:

$$L'_{opt} = \min(L_{opt}^{(1)}, L_{opt}^{(2)}). \quad (32)$$

After the CR user computes either the duration of the silent block (block 420) or the data block (block 425) depending on the availability of the spectrum band (block 410), the CR user may schedule a subsequent sensing block (block 430). The subsequent sensing block may be scheduled to occur at a time substantially equal to a start time of the inter-sensing block plus either the computed duration of the silent block or the data block. After scheduling the subsequent sensing block (block 430), the CR user may either communicate (if the inter-sensing block is a data block) or not communicate (if the inter-sensing block is a silent block) until it is time for the CR user to once again determine the availability of the spectrum band (block 435).

Figure 5:
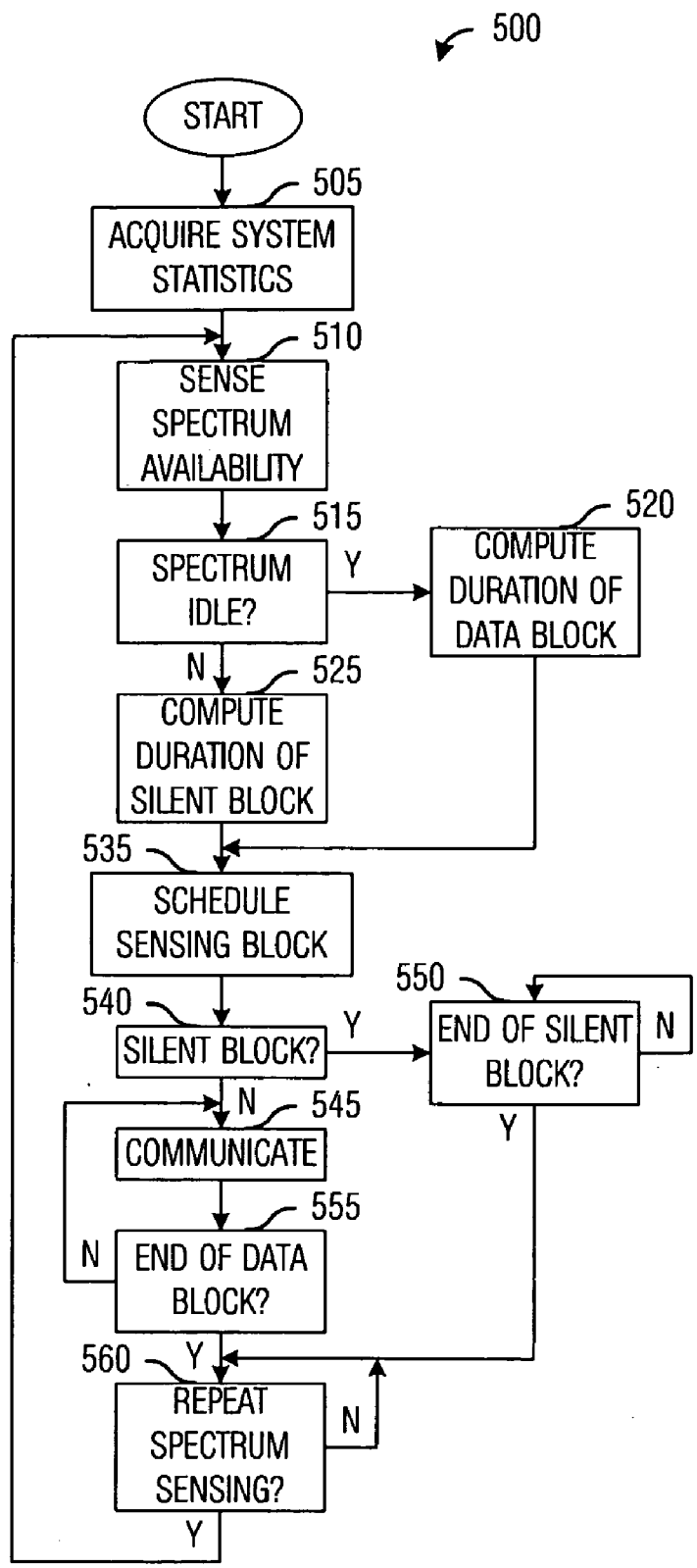
FIG. 5 is a flow diagram illustrating a sequence of events in the operation of a CR user of a CR system.

FIG. 5 is a flow diagram illustrating a sequence of events 500 in the operation of a CR user of a CR system. Sequence of events 500 may be descriptive of events occurring in the operation of a CR user of a CR system, such as when the CR user is operating in an operating mode that permits spectrum sensing and transmissions, such as a normal transmission mode, low power mode, and so forth, and may continue until the operating mode is stopped or the CR user is turned off, reset, or so on.

The operation of the CR user may begin with the CR user acquiring system statistics (block 505). The CR user may acquire statistics related to the usage of a spectrum band by licensed users in a licensed system, usage of the spectrum band by CR users in the CR system, and so forth. The CR user may acquire statistics by monitoring the spectrum band for a period of time. The CR user may acquire the statistics by entering an acquisition mode when it is initially turned on. The CR user may further acquire statistics by periodically entering the acquisition mode to help ensure that the system statistics that it has remain accurate. Alternatively, the CR user may access stored system statistics which were previously collected and stored. The stored system statistics may be stored in the CR user, in a centralized location (database) accessible by CR users in the CR system, etc. Furthermore, the CR user may use a combination of both stored system statistics and monitored statistics.

After the CR user has acquired system statistics, the CR user may sense availability of the spectrum band (block 510). The CR user may make use of a spectrum sensing unit, such as spectrum sensing unit 340, to sense spectrum availability. If the spectrum band is busy (not available for use by the CR user), the CR user may compute a duration of an inter-sensing block that will not be used for transmission by the CR user, i.e., a silent block (block 520). The computing of the duration of the silent block may utilize equations as discussed previously.

However, if the spectrum band is idle (available for use by the CR user), the CR user may compute a duration of an inter-sensing block that will be used for transmission by the CR user, i.e., a data block (block 525). The computing of the duration of the data block may utilize equations as discussed previously. The CR user may compute the duration of the data block even if it does not have any information to transmit.

With either the duration of the silent block or the duration of the data block computed, the CR user may also schedule a subsequent sensing block (block 535). The subsequent sensing block may occur at about a time equal to a sum of a time at the end of the sensing block plus the duration of either the silent block or the data block. Alternatively, the subsequent sensing block may occur at about a time equal to a sum of a time at the start of the sensing block plus the duration of the sensing block and the duration of either the silent block or the data block.

After scheduling the subsequent sensing block, the CR user may determine if it will be able to perform any communication in the inter-sensing block. If the inter-sensing block is not a silent block (block 540), then the CR user may be able to perform communications for the duration of the data block (block 545). During the data block, the CR user may transmit and/or receive information to and from other CR users. However, if the inter-sensing block is a silent block (block 540), then the CR user may not be able to perform any communication and it will remain idle (at least communications wise) until the end of the silent block (block 550).

At the end of either the silent block (block 550) or the data block (block 555), the CR user may check to determine if the sensing of the spectrum band's availability is to be repeated (block 560). If it is to be repeated, the CR user may begin another determining of spectrum band availability by returning to block 510. The CR user may check if the sensing of the spectrum band's availability is to be repeated by comparing a scheduled time of the sensing of the spectrum band's availability (i.e., the scheduled time of the sensing block) with a current time. If the two times are about equal, then the sensing of the spectrum band's availability will be repeated. If the two times are not equal, then the CR user may need to wait.

Figure 6:
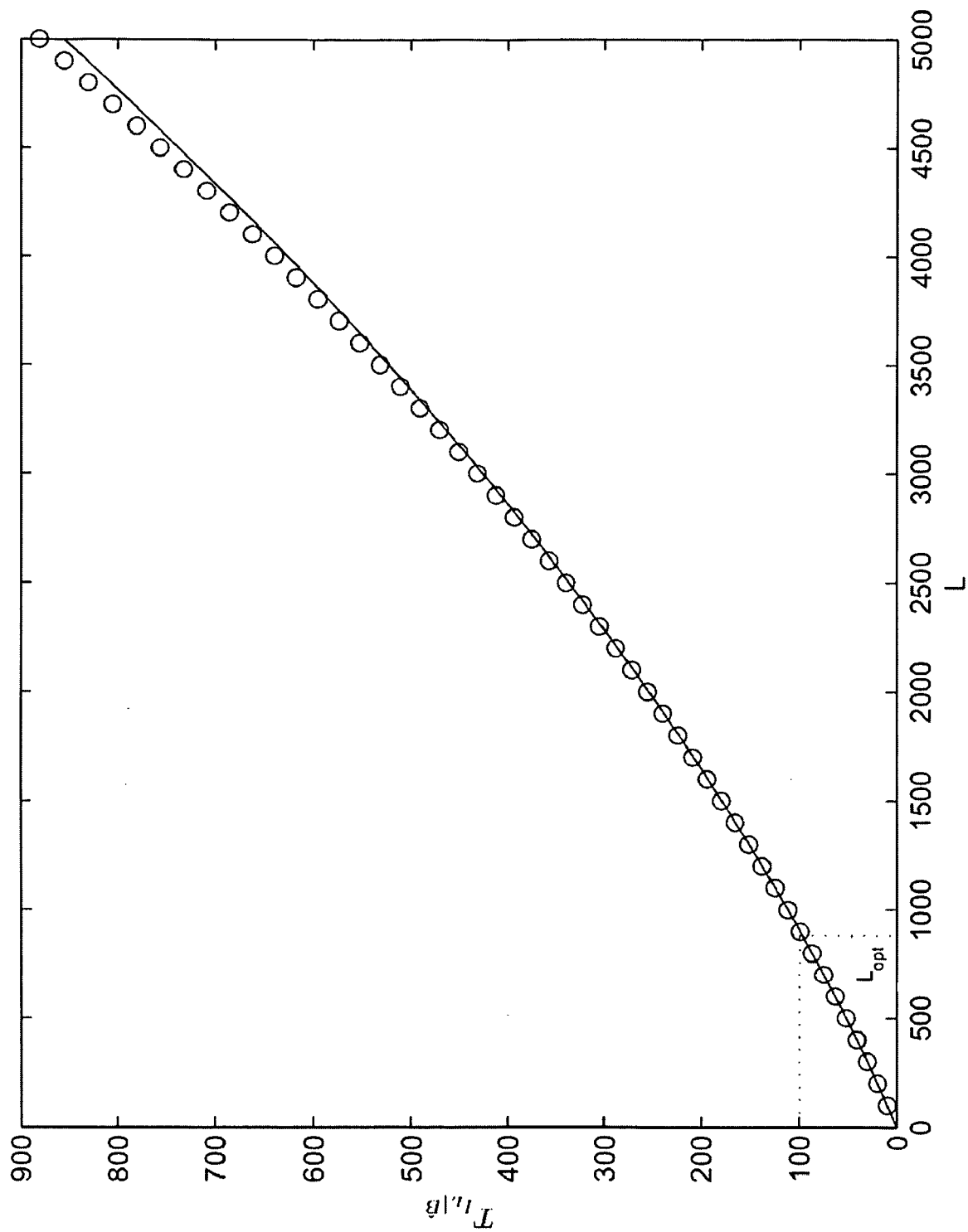
FIG. 6 is a data plot illustrating theoretical and approximated values of average spectrum opportunity loss ($T_{I_L|\bar{B}}$) with respect to the length of the silent block, L.

FIG. 6 is a data plot illustrating theoretical and approximated values of average spectrum opportunity loss ($T_{I_L|\hat{B}}$) with respect to the length of the silent block, L. The theoretical values (computed using equation (17)) are displayed as a solid line and the approximated values (computed using equation (18)) are displayed as the series of circles. As shown in FIG. 6, the average spectrum opportunity loss is shown as an increasing function of L. Furthermore, the approximated values are shown to be a good approximation of the theoretical values. Also shown in FIG. 6, with a value of $T_\lambda=100$, a corresponding optimal length of the silent block is about 800 samples.

Figure 7:
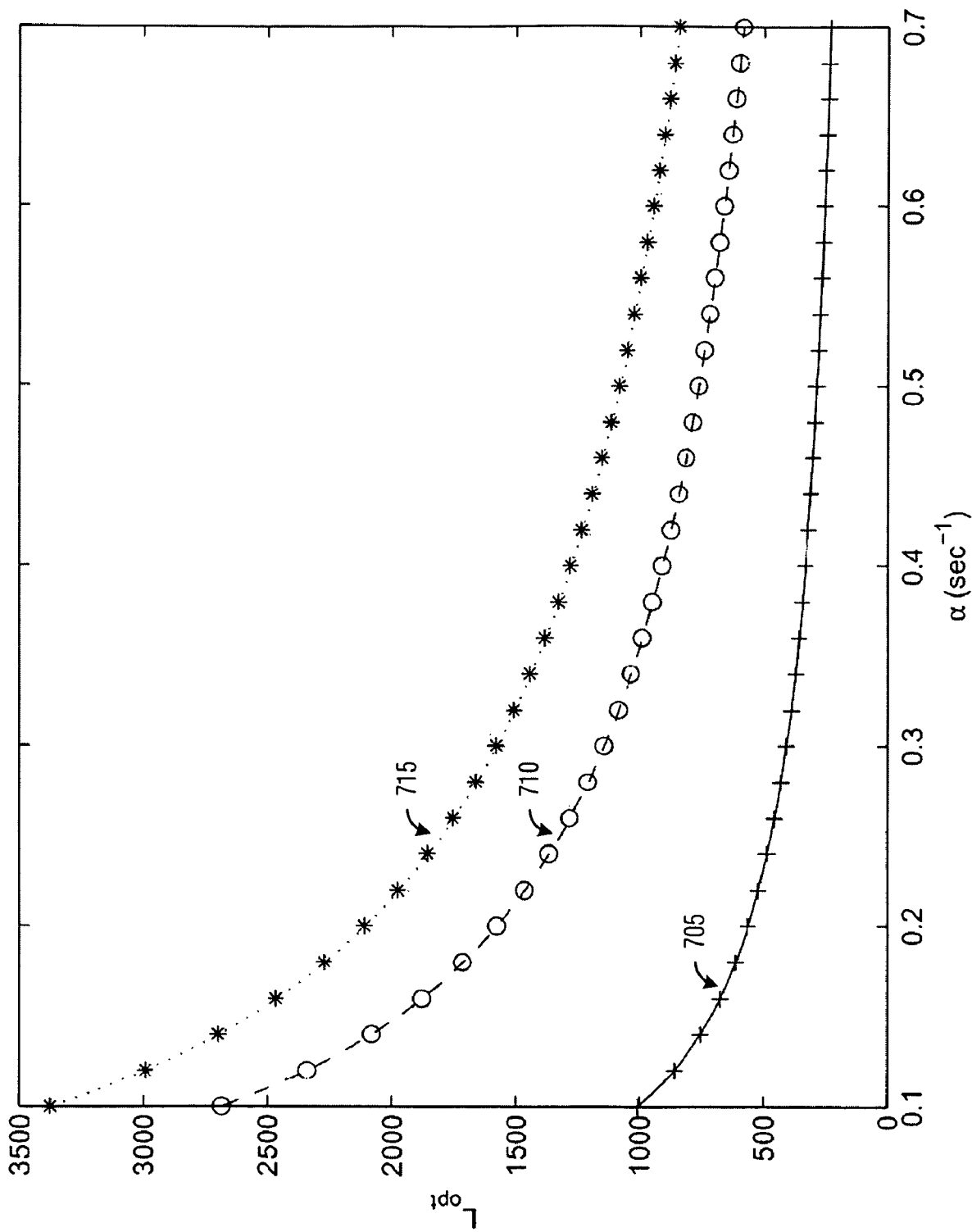
FIG. 7 is a data plot comparing the optimal length of the silent block achieved using an exhaustive search of theoretical values and approximated values with $T_\lambda=100$ with different state transition rates.

FIG. 7 is a data plot comparing the optimal length of the silent block achieved using an exhaustive search of theoretical values and approximated values with $T_\lambda=100$ with different state transition rates. Curve 705 displays theoretical (line) and approximated (pluses) values for $\beta=0.1$ sec$^{-1}$, curve 710 displays theoretical (dashed line) and approximated values (circles) for $\beta=0.4$ sec$^{-1}$, and curve 715 displays theoretical (dotted line) and approximated values (stars) for $\beta=0.7$ sec$^{-1}$. FIG. 7 shows that once again the approximated values matches the theoretical values closely. As shown in FIG. 7, as the transition rate from busy to idle state or from idle to busy state increases, the optimal length of the silent block becomes smaller or larger, respectively.

Figure 8:
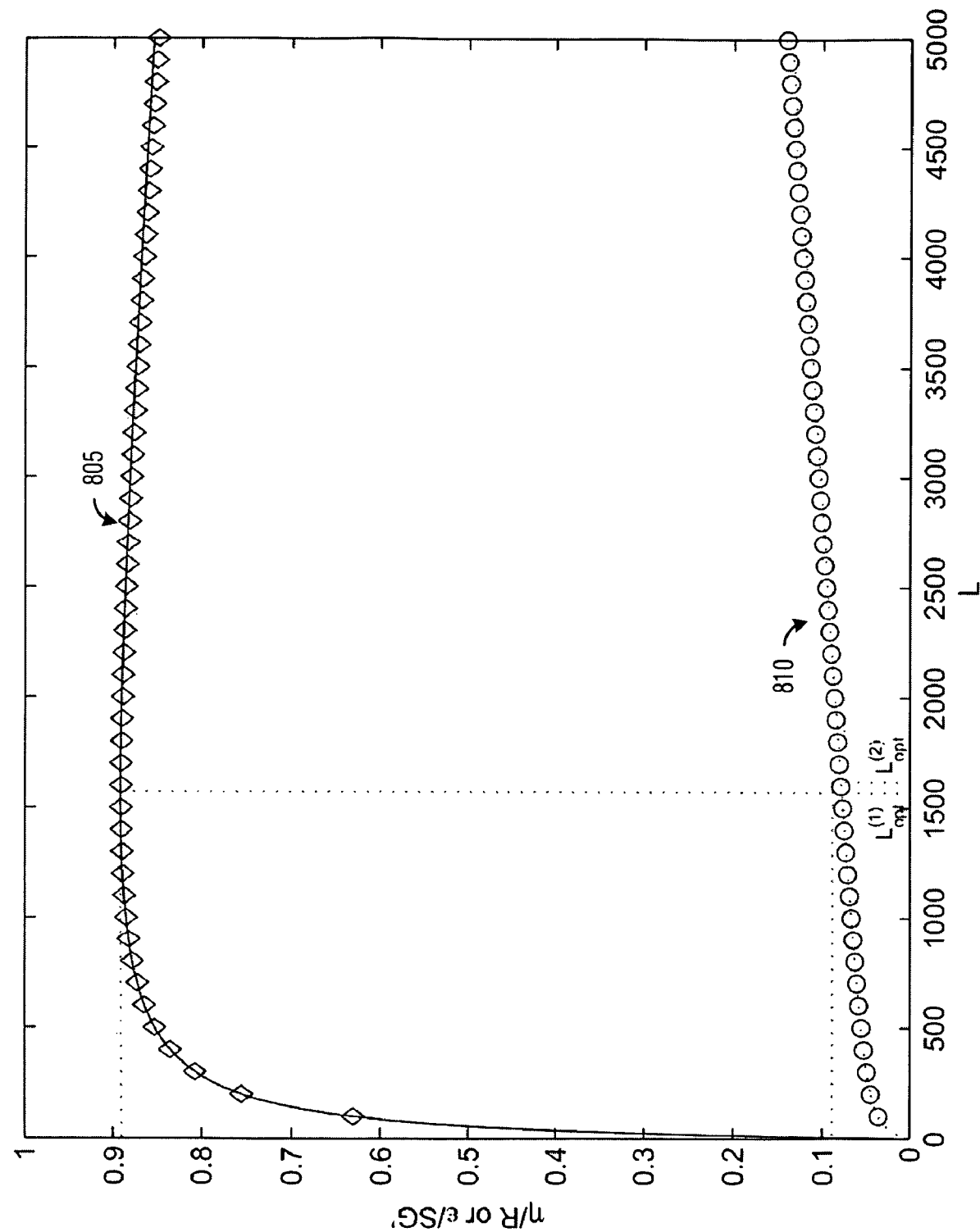
FIG. 8 is a data plot illustrating both theoretical and approximated values of normalized average transmission rate, $\eta/R$, and average interference power, $\epsilon/SG'$, with respect to length of data block, L.

FIG. 8 is a data plot illustrating both theoretical and approximated values of normalized average transmission rate, $\eta/R$, and average interference power, $\epsilon/SG'$, with respect to length of data block, L. The normalized average transmission rate is shown as curve 805, while curve 810 displays the average interference power. The initially increasing and later decreasing nature of the normalized average transmission rate and the increasing nature of the average interference power are clearly seen. Also, for a given $\Gamma=0.08SG'$, a corresponding optimal length of the data block is found. First, the maximum normalized average transmission rate and the corresponding length of the data block are found, $L=L_{opt}^{(1)}$, then the interference power constraint and corresponding length of the data block are found, $L=L_{opt}^{(2)}$, then the smaller of the two values is selected, $L'_{opt}=\min(L_{opt}^{(1)}, L_{opt}^{(2)})$.

Figure 9:
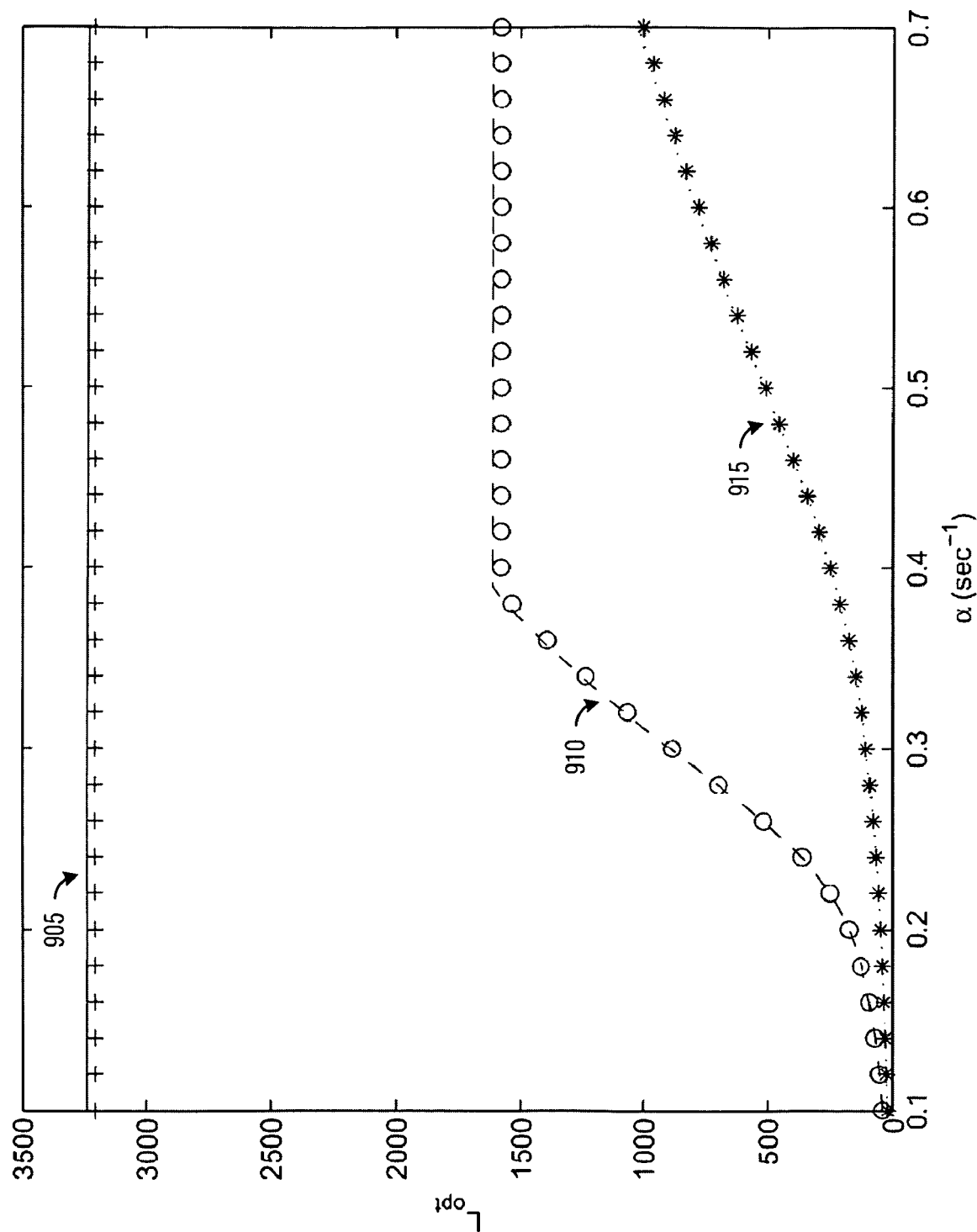
FIG. 9 is a data plot that compares the optimal length of the data block achieved through exhaustive search of theoretical values and approximated values given $\Gamma=0.08SG'$ with different state transition rates.

FIG. 9 is a data plot that compares the optimal length of the data block achieved through exhaustive search of theoretical values and approximated values given $\Gamma=0.08SG'$ with different state transition rates. Curve 905 displays theoretical (line) and approximated (pluses) values for $\beta=0.1$ sec$^{-1}$, curve 910 displays theoretical (dashed line) and approximated values (circles) for $\beta=0.4$ sec$^{-1}$, and curve 915 displays theoretical (dotted line) and approximated values (stars) for $\beta=0.7$ sec$^{-1}$. With $\beta=0.4$ sec$^{-1}$, curve 910 includes an inflexion with points to the left of the inflexion determined by equation (31) and points to the right of the inflexion determined by equation (30), with $\beta=0.1$ sec$^{-1}$, curve 905 is determined by equation (30) and with $\beta=0.7$ sec$^{-1}$, curve 915 is determined by equation (31). As shown in FIG. 9, as the transition rate from busy to idle state or from idle to busy state increases, the optimal length of the data block becomes larger or smaller. This is contrary to the result for the optimal length of the idle block (FIG. 7).

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for scheduling a spectrum sensing operation, the method comprising:
   sensing an availability of a spectrum band;
   computing a duration of an inter-sensing time block based on the availability of the spectrum band, wherein the computing a duration comprises
      when the spectrum band is available, computing a duration of a data block in accordance with a conditional idle probability at an end of spectrum sensing if the spectrum band is detected as being unavailable, a conditional busy probability at an end of spectrum sensing if the spectrum band is detected as being unavailable, a transition rate of the spectrum band from busy to idle state, and a transition rate of the spectrum band from idle to busy state; and
      when the spectrum band is unavailable, computing a duration of a silent block in accordance with a conditional idle probability at an end of spectrum sensing if the spectrum band is detected as being available, a conditional busy probability at an end of spectrum sensing if the spectrum band is detected as being available, a transition rate of the spectrum band from busy to idle state, and a transition rate of the spectrum band from idle to busy state; and
   scheduling an occurrence of the spectrum sensing operation using the duration of the inter-sensing time block.

2. The method of claim 1, wherein the spectrum sensing operation occurs after the inter-sensing time block ends.

3. The method of claim 1, further comprising prior to the sensing, acquiring system statistics.

4. The method of claim 1, wherein the acquiring system statistics comprises:
   monitoring the spectrum band; and
   saving statistics related to usage of the spectrum band.

5. The method of claim 1, wherein the acquiring system statistics comprises retrieving statistics regarding usage of the spectrum band from a database.

6. The method of claim 1, further comprising after the scheduling, repeating the sensing, the computing, and the scheduling in response to determining that a current time is about equal to the scheduled occurrence of the spectrum sensing operation.

7. The method of claim 1, wherein the spectrum band is available if it is sensed to be idle, and wherein the spectrum band is unavailable if it is sensed to be busy.

8. The method of claim 1, wherein the computing a duration of a silent block comprises computing the duration of the silent block to minimize a spectrum opportunity loss, wherein the spectrum opportunity loss is an expected number of idle samples within the inter-sensing time block when the spectrum band is determined unavailable.

9. The method of claim 1, wherein the computing a duration of a silent block comprises evaluating expression:

$$L_{opt} = \left\lfloor \frac{\sqrt{P_{I|\hat{B}}^2 + 2(P_{B|\hat{B}}\alpha\tau - P_{I|\hat{B}}\beta\tau)T_\lambda} - P_{I|\hat{B}}}{P_{B|\hat{B}}\alpha\tau - P_{I|\hat{B}}\beta\tau} \right\rfloor,$$

where $L_{opt}$ is the duration of the silent block in number of samples, $P_{I|\hat{B}}$ is the conditional idle probability at an end of spectrum sensing if the spectrum band is detected as being unavailable, $P_{B|\hat{B}}$ is the conditional busy probability at an end of spectrum sensing if the spectrum band is detected as being unavailable, $T_\lambda$ is a specified spectrum band unavailability identification speed requirement, $\alpha$ is the transition rate of the spectrum band from busy to idle state, $\beta$ is the transition rate of the spectrum band from idle to busy state, and $\tau$ is a sampling interval.

10. The method of claim 1, wherein the computing a duration of a data block comprises computing the duration of the data block to maximize an average transmission rate and to minimize an average interference power, wherein the average transmission rate is the expected rate of communications made during the data block and the average interference power is an expected interference power at a receiver due to communications made during the data block.

11. The method of claim 1, wherein the computing a duration of a data block comprises:
evaluating a first expression, $$L = L_{opt}^{(1)} = \left\lfloor \sqrt{M^2 + \frac{2P_{I|\hat{I}}M}{P_{I|\hat{I}}\beta\tau - P_{B|\hat{I}}\alpha\tau}} - M \right\rfloor;$$

evaluating a second expression, $$L \le L_{opt}^{(2)} = \left\lfloor \frac{\sqrt{(P_{B|\hat{I}} - \Gamma)^2 + 2(P_{I|\hat{I}}\beta\tau - P_{B|\hat{I}}\alpha\tau)\Gamma L} - P_{B|\hat{I}} + \Gamma}{P_{I|\hat{I}}\beta\tau - P_{B|\hat{I}}\alpha\tau} \right\rfloor; \text{ and}$$

selecting a smaller of the first expression or the second expression as $L'_{opt}$, where $L'_{opt}$ is the duration of the data block in number of samples, M is a duration of the spectrum sensing in samples, $P_{I|\hat{I}}$ is the conditional idle probability at an end of spectrum sensing if the spectrum band is detected as being available, $P_{B|\hat{I}}$ is the conditional busy probability at an end of spectrum sensing if the spectrum band is detected as being available, $\Gamma$ is an interference threshold for protecting licensed users, $\alpha$ is the transition rate of the spectrum band from busy to idle state, $\beta$ is the transition rate of the spectrum band from idle to busy state, and $\tau$ is a sampling interval.

12. A method for operating an electronic device, the method comprising:
sensing a state of a spectrum band during a first sensing time block;
computing a duration of an inter-sensing time block based on the state of the spectrum band, wherein the inter-sensing time block follows the first sensing time block, wherein the computing a duration comprises
when the state of the spectrum band is idle, computing a duration of the inter-sensing time block for use as a data time block in accordance with a conditional idle probability at an end of spectrum sensing if the spectrum band is detected as being unavailable, a conditional busy probability at an end of spectrum sensing if the spectrum band is detected as being unavailable, a transition rate of the spectrum band from busy to idle state, and a transition rate of the spectrum band from idle to busy state; and
when the state of the spectrum band is busy, computing a duration of the inter-sensing time block for use as a silent time block in accordance with a conditional idle probability at an end of spectrum sensing if the spectrum band is detected as being available, a conditional busy probability at an end of spectrum sensing if the spectrum band is detected as being available, a transition rate of the spectrum band from busy to idle state, and a transition rate of the spectrum band from idle to busy state;
scheduling an occurrence of a second sensing time block using the computed duration of the inter-sensing time block;
operating the electronic device for the computed duration of the inter-sensing time block; and
repeating the sensing, the computing, the scheduling, and the operating for the second sensing time block in response to determining that a current time is about equal to a scheduled time for the occurrence of the second sensing time block.

13. The method of claim 12, wherein the operating comprises:
remaining silent in response to determining that the state of the spectrum band is busy; and
participating in communications with another electronic device in response to determining that the state of the spectrum band is idle.

14. The method of claim 12, wherein the scheduling comprises scheduling the second sensing time block to occur at a time substantially equal to an end time of the first sensing time block plus the computed duration of the inter-sensing time block.

15. The method of claim 12, further comprising acquiring system statistics prior to the computing, and wherein the computing is further based on the system statistics.

16. The method of claim 12, wherein the computing a duration of the inter-sensing time block for use as a data time block comprises:
evaluating a first expression, $$L = L_{opt}^{(1)} = \left\lfloor \sqrt{M^2 + \frac{2P_{I|\hat{I}}M}{P_{I|\hat{I}}\beta\tau - P_{B|\hat{I}}\alpha\tau}} - M \right\rfloor;$$

evaluating a second expression, $$L \le L_{opt}^{(2)} = \left\lfloor \frac{\sqrt{(P_{B|\hat{I}} - \Gamma)^2 + 2(P_{I|\hat{I}}\beta\tau - P_{B|\hat{I}}\alpha\tau)\Gamma L} - P_{B|\hat{I}} + \Gamma}{P_{I|\hat{I}}\beta\tau - P_{B|\hat{I}}\alpha\tau} \right\rfloor; \text{ and}$$

selecting a smaller of the first expression or the second expression as $L'_{opt}$, where $L'_{opt}$ is the duration of the data block in number of samples, M is a duration of the spectrum sensing in samples, $P_{I|\hat{I}}$ is the conditional idle probability at an end of spectrum sensing if the spectrum band is detected as being available, $P_{B|\hat{I}}$ is the conditional busy probability at an end of spectrum sensing if the spectrum band is detected as being available, $\Gamma$ is an interference threshold for protecting licensed users, $\alpha$ is the transition rate of the spectrum band from busy to idle state, $\beta$ is the transition rate of the spectrum band from idle to busy state, and $\tau$ is a sampling interval.

17. The method of claim 12, wherein the computing a duration of the inter-sensing time block for use as a silent time block comprises evaluating expression:

$$L_{opt} = \left\lfloor \frac{\sqrt{P_{I|\hat{B}}^2 + 2(P_{B|\hat{B}}\alpha\tau - P_{I|\hat{B}}\beta\tau)T_\lambda} - P_{I|\hat{B}}}{P_{B|\hat{B}}\alpha\tau - P_{I|\hat{B}}\beta\tau} \right\rfloor,$$

where $L_{opt}$ is the duration of the silent block in number of samples, $P_{I|\hat{B}}$ is the conditional idle probability at an end of spectrum sensing if the spectrum band is detected as being unavailable, $P_{B|\hat{B}}$ is the conditional busy probability at an end of spectrum sensing if the spectrum band is detected as being unavailable, $T_\lambda$ is a specified spectrum band availability/unavailability identification speed requirement, $\alpha$ is the transition rate of the spectrum band from busy to idle state, $\beta$ is the transition rate of the spectrum band from idle to busy state, and $\tau$ is a sampling interval.

18. An electronic device comprising:
a receiver coupled to an antenna, the receiver configured to receive signals detected by the antenna;
a transmitter coupled to the antenna, the transmitter configured to transmit signals using the antenna; and
a processor coupled to the receiver and to the transmitter, the processor configured to sense a state of a spectrum band over which signals are transmitted and received, and to calculate a duration of an inter-sensing block that will allow the electronic device to participate in communications with another electronic device or to remain idle based on the state of the spectrum band, wherein the processor configured to calculate a duration comprises the processor configured to, when the spectrum band is available, compute a duration of a data block in accordance with a conditional idle probability at an end of spectrum sensing if the spectrum band is detected as being unavailable, a conditional busy probability at an end of spectrum sensing if the spectrum band is detected as being unavailable, a transition rate of the spectrum band from busy to idle state, and a transition rate of the spectrum band from idle to busy state; and
the processor configured to, when the spectrum band is unavailable, compute a duration of a silent block in accordance with a conditional idle probability at an end of spectrum sensing if the spectrum band is detected as being available, a conditional busy probability at an end of spectrum sensing if the spectrum band is detected as being available, a transition rate of the spectrum band from busy to idle state, and a transition rate of the spectrum band from idle to busy state.

19. The electronic device of claim 18, wherein the processor comprises:
a spectrum sensing unit configured to sense a state of the spectrum band;
a silent block calculator unit coupled to the spectrum sensing unit, the silent block calculator unit configured to calculate the duration of an inter-sensing block that will allow the electronic device to remain idle; and
a data block calculator unit coupled to the spectrum sensing unit, the silent data block calculator unit configured to calculate the duration of an inter-sensing block that will allow the electronic device to participate in communications with another electronic device.

20. The electronic device of claim 18, wherein the electronic device operates in a cognitive radio system operating in proximity to a communications system having transmission priority over transmissions made by the cognitive ratio system.

* * * * *